(12) United States Patent
Kumar et al.

(10) Patent No.: US 9,804,854 B2
(45) Date of Patent: *Oct. 31, 2017

(54) BRANCHING TO ALTERNATE CODE BASED ON RUNAHEAD DETERMINATION

(71) Applicant: NVIDIA CORPORATION, Santa Clara, CA (US)

(72) Inventors: Rohit Kumar, Sunnyvale, CA (US); Guillermo Rozas, Los Gatos, CA (US); Magnus Ekman, Alameda, CA (US); Lawrence Spracklen, Boulder Creek, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,171

(22) Filed: Feb. 27, 2017

(65) Prior Publication Data

US 2017/0168839 A1 Jun. 15, 2017

Related U.S. Application Data

(63) Continuation of application No. 13/945,838, filed on Jul. 18, 2013, now Pat. No. 9,582,280.

(51) Int. Cl.
*G06F 9/38* (2006.01)
*G06F 9/30* (2006.01)

(52) U.S. Cl.
CPC ........ *G06F 9/3861* (2013.01); *G06F 9/30058* (2013.01); *G06F 9/3867* (2013.01); *G06F 9/3842* (2013.01)

(58) Field of Classification Search
CPC .............................. G06F 9/3842; G06F 9/3861
See application file for complete search history.

(56) References Cited

U.S. PATENT DOCUMENTS

| 5,487,146 A | 1/1996 | Guttag et al. |
| 5,721,855 A | 2/1998 | Hinton et al. |

(Continued)

FOREIGN PATENT DOCUMENTS

| CN | 1519728 | 8/2004 |
| CN | 1629799 | 6/2005 |

(Continued)

OTHER PUBLICATIONS

Altera—"Implementing a Queue Manager in Traffic Management Systems", Feb. 2004, "pp. 1-8".

(Continued)

*Primary Examiner* — Zachary K Huson

(57) ABSTRACT

The description covers a system and method for operating a micro-processing system having a runahead mode of operation. In one implementation, the method includes providing, for a first portion of code, a runahead correlate. When the first portion of code is encountered by the micro-processing system, a determination is made as to whether the system is operating in the runahead mode. If so, the system branches to the runahead correlate, which is specifically configured to identify and resolve latency events likely to occur when the first portion of code is encountered outside of runahead. Branching out of the first portion of code may also be performed based on a determination that a register is poisoned.

20 Claims, 2 Drawing Sheets

(56) References Cited

U.S. PATENT DOCUMENTS

| | | | |
|---|---|---|---|
| 5,864,692 | A | 1/1999 | Faraboschi et al. |
| 5,870,582 | A | 2/1999 | Cheong et al. |
| 5,956,753 | A | 9/1999 | Glew et al. |
| 6,037,946 | A | 3/2000 | Takeda |
| 6,519,694 | B2 | 2/2003 | Harris |
| 7,010,648 | B2 | 3/2006 | Kadambi et al. |
| 7,062,631 | B1 | 6/2006 | Klaiber et al. |
| 7,117,330 | B1 | 10/2006 | Alverson et al. |
| 7,194,604 | B2 | 3/2007 | Bigelow et al. |
| 7,293,161 | B1 | 11/2007 | Chaudhry et al. |
| 7,421,567 | B2 | 9/2008 | Eickemeyerk et al. |
| 7,587,584 | B2 | 9/2009 | Enright et al. |
| 7,752,627 | B2 | 7/2010 | Jones et al. |
| 7,873,793 | B1 | 1/2011 | Rozas et al. |
| 7,890,735 | B2 | 2/2011 | Tran |
| 8,035,648 | B1 | 10/2011 | Wloka et al. |
| 8,707,011 | B1 | 4/2014 | Glasco et al. |
| 9,582,280 | B2 * | 2/2017 | Kumar ............... G06F 9/30189 |
| 2003/0018685 | A1 | 1/2003 | Kalafatis et al. |
| 2003/0196010 | A1 | 10/2003 | Forin et al. |
| 2004/0128448 | A1 | 7/2004 | Stark et al. |
| 2005/0041031 | A1 | 2/2005 | Diard |
| 2005/0055533 | A1 | 3/2005 | Kadambi et al. |
| 2005/0138332 | A1 | 6/2005 | Kottapalli et al. |
| 2005/0154831 | A1 | 7/2005 | Steely, Jr. et al. |
| 2006/0010309 | A1 | 1/2006 | Chaudhry et al. |
| 2006/0095678 | A1 | 5/2006 | Bigelow et al. |
| 2006/0174228 | A1 | 8/2006 | Radhakrishnan et al. |
| 2006/0212688 | A1 | 9/2006 | Chaudhry et al. |
| 2006/0277398 | A1 | 12/2006 | Akkary et al. |
| 2007/0074006 | A1 | 3/2007 | Martinez et al. |
| 2007/0174555 | A1 | 7/2007 | Burtscher et al. |
| 2007/0186081 | A1 | 8/2007 | Chaudhry et al. |
| 2007/0204137 | A1 | 8/2007 | Tran |
| 2009/0019317 | A1 | 1/2009 | Quach et al. |
| 2009/0327661 | A1 | 12/2009 | Sperber et al. |
| 2010/0199045 | A1 | 8/2010 | Bell et al. |
| 2010/0205402 | A1 | 8/2010 | Henry et al. |
| 2010/0205415 | A1 | 8/2010 | Henry et al. |
| 2012/0023359 | A1 | 1/2012 | Edmeades et al. |
| 2012/0089819 | A1 | 4/2012 | Chaudhry et al. |
| 2013/0124829 | A1 | 5/2013 | Chou et al. |
| 2014/0082291 | A1 | 3/2014 | Van Zoeren et al. |
| 2014/0122805 | A1 | 5/2014 | Ekman et al. |
| 2014/0136891 | A1 | 5/2014 | Holmer et al. |
| 2014/0164736 | A1 | 6/2014 | Rozas et al. |
| 2014/0164738 | A1 | 6/2014 | Ekman et al. |
| 2014/0281259 | A1 | 9/2014 | Klaiber et al. |

FOREIGN PATENT DOCUMENTS

| | | |
|---|---|---|
| CN | 1831757 | 9/2006 |
| CN | 102184127 | 9/2011 |
| CN | 103793205 | 5/2014 |
| EP | 0671718 | 9/1995 |
| GB | 2287111 | 9/1995 |
| TW | 200405201 | 4/2004 |
| TW | 200529071 | 9/2005 |
| TW | 1263938 | 10/2006 |
| TW | I275938 | 3/2007 |
| TW | 200723111 | 6/2007 |
| TW | 200809514 | 2/2008 |
| TW | 1315488 | 10/2009 |
| TW | I315488 | 10/2009 |
| TW | 201032627 | 9/2010 |
| TW | 201112254 | 4/2011 |
| TW | 1425418 | 2/2014 |
| TW | I425418 | 2/2014 |

OTHER PUBLICATIONS

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, filed Dec. 7, 2012, 32 Pages.

Ekman, M. et al., "Selective Poisoning of Data During Runahead", U.S. Appl. No. 13/662,171, filed Oct. 26, 2012, 33 pages.

Holmer, B., et al., "Managing Potentially Invalid Results During Runahead", U.S. Appl. No. 13/677,085, filed Nov. 14, 2012, 29 pages.

Wikipedia article, "Instruction Prefetch," https://en.wikipedia.org/wiki/Instruction_prefetch, downloaded May 23, 2016.

Wikipedia article, "x86," https://en.wikipedia.org/wiki/X86, downloaded May 23, 2016.

Adve, S. et al., "Shared Memory Consistency models: A Turorial", WRL Research Report 95/7, Western Digital Laboratory, Sep. 1995, 32 pages.

Chaudry, S. et al., "High-Performance Throughput Computing," Micro, IEEE 25.3, pp. 32-45, May 2005, 14 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Rozas, Guillermo J. et al., "Queued Instruction Re-Dispatch After Runahead," U.S. Appl. No. 13/730,407, filed Dec. 28, 2012, 36 pages.

Rozas, J. et al., "Lazy Runahead Operation for a Microprocessor", U.S. Appl. No. 13/708,645, filed Dec. 7, 2012, 32 pages.

NVIDIA Corp. Akquirierung spekulativer Genehmigung jur gemeinsam genutzten Speicher, Mar. 20, 2014, SW102013218370 A1, German Patent Office, All Pages.

Intel Itanium Architecture Software Developer's Manual, Intel, http://www.intel.com/design/itanium/manuals/iiasdmanual.htm, 1 page, Mar. 8, 2013.

Mutlo, O. et al. "Runahead Execution: An Alternative to Very large Instruction Windows for Out-of-order Processors," This paper appears in: "High-Performance Computer Architecture," Feb. 8-12, 2003, 13 pages.

\* cited by examiner

BRANCHING TO ALTERNATE CODE BASED ON RUNAHEAD DETERMINATION

CROSS-REFERENCE TO RELATED APPLICATIONS

The present application is a continuation of, claims the benefit of and priority to U.S. application Ser. No. 13/945,838, filed Jul. 18, 2013, entitled "BRANCHING TO ALTERNATE CODE BASED ON RUNAHEAD DETERMINATION" and hereby incorporated by reference in its entirety.

BACKGROUND

Some micro-processing systems support a speculative execution mode known as runahead. Runahead allows a microprocessor to pre-fetch and otherwise pre-process instructions during a stall condition or other latency event such as a cache miss. While the initial latency event is being serviced—e.g., the memory system is traversed to obtain requested data—execution moves forward speculatively to uncover additional latency events (e.g., stalls) in the code that are independent of the condition causing the initial event. The system then uses resources that would otherwise be idle to service these additional latency events while servicing the initial event. Once the initial event is resolved (e.g., the cache miss is resolved by obtaining the missing data), execution resumes via a checkpointing mechanism at the runahead entry point. The resumed execution will then be more efficient, in the sense that one or more additional latency events may be avoided (or resolved more quickly) due to them being serviced in the just-terminated runahead episode. In many systems, code executed during runahead is executed in more or less the same fashion as when encountered outside of runahead, which in various ways limits the ability of the system to address additional latency events.

DETAILED DESCRIPTION

The following description and claims are directed to improved systems and methods for conducting runahead episodes in a micro-processing system. In one embodiment, the description includes branching out of a portion of code based on affirmatively determining that the system is in runahead when the code portion is encountered in the processing pipeline. The system branches to alternate code, referred to as runahead correlate code, which is associated with the initial code being branched from. In some examples, the branching mechanism is a special instruction that executes when the initial code portion is encountered and tests for runahead.

The runahead correlate code is specifically designed to enhance the process of uncovering and resolving additional latency events (i.e., in addition to the cache miss or other latency event that triggered runahead), or to avoid/terminate runahead when it is unlikely to provide a benefit. Examples include runahead correlate code that deactivates, skips or otherwise omits instructions in the original code that do not further the purpose of runahead. Instructions that are dependent upon the runahead-triggering event may be avoided, e.g., instructions that require data that missed in the cache. Instructions may be omitted based on being time-consuming; computationally intensive; consuming a lot of power; focusing on computations unrelated to address calculation or other memory operations; etc.

In addition to or instead of omitting instructions, runahead correlate code can otherwise be tuned to optimize runahead. The correlate code can include control flow commands that change the way the initial code is executed, e.g., to jump ahead to a subsequent iteration of a loop when it is determined that the current loop is unlikely to yield an additional latency event. In general, the runahead correlate code emphasizes, prioritizes, etc., instructions that lead to the rapid uncovering of additional cache misses, branch mispredicts, TLB misses, and other latency events that are independent of the initial runahead-triggering condition and that are likely to occur when the code being branched from is executed outside of runahead.

In addition to branching based on runahead, the systems and methods herein can also include branching to alternate code based on a register being poisoned. This poison test can be used independently or in conjunction with the runahead test. For example, if an instruction in runahead references a poisoned register, there may be a number of following instructions that then become useless for purposes of uncovering additional latency events. In such a case, the affirmative determinations of runahead and the poisoned register can trigger a branch that skips the subsequent poisoned instructions.

Figure 1:
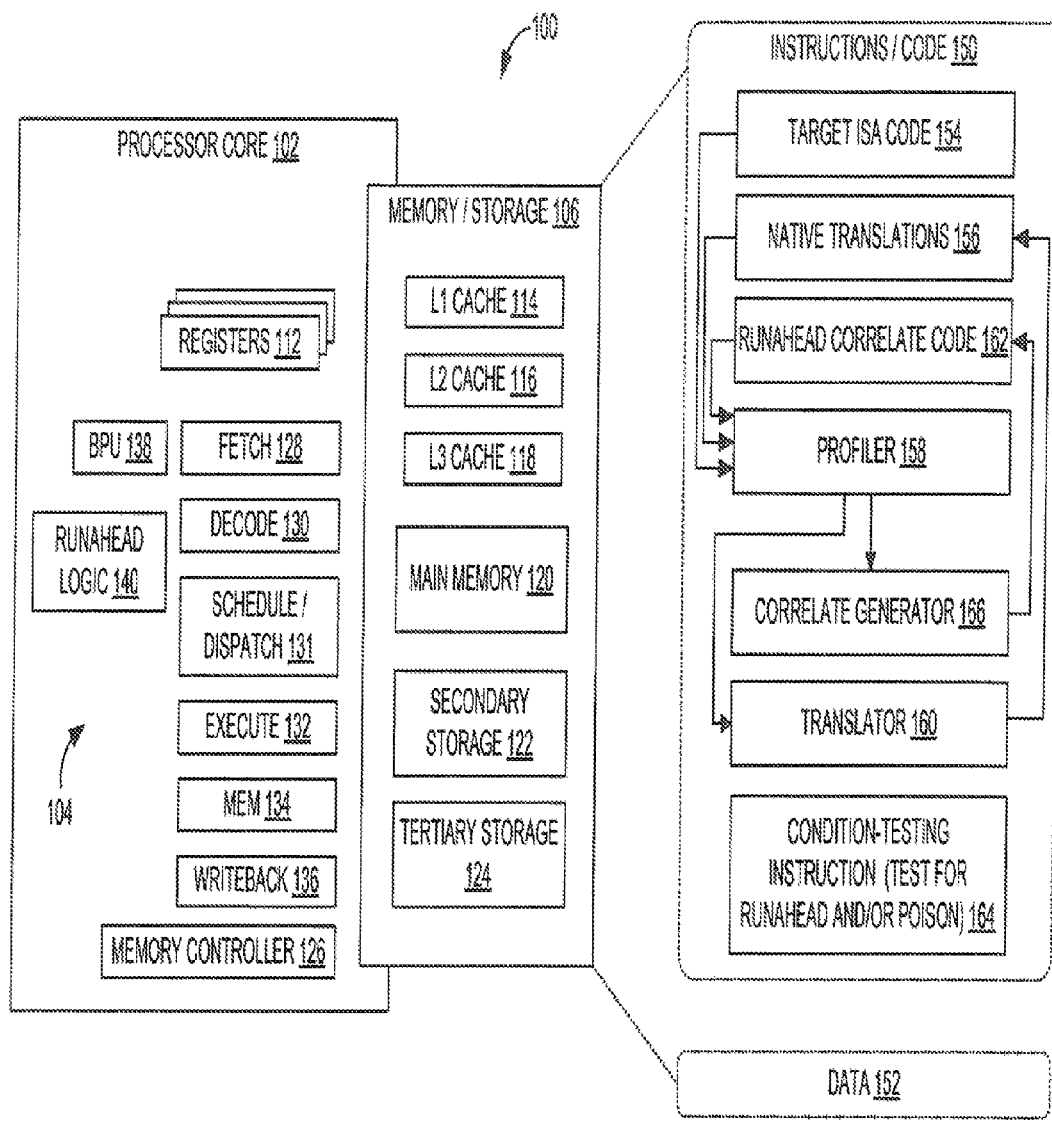
FIG. 1 schematically depicts a micro-processing system configured to allow branching to alternate code upon determining that the system is operating in a runahead mode of speculative execution, and/or to alternate code based upon a determination that instructions are using poisoned registers. When branching based on runahead, the depicted system branches to runahead correlate code adapted to improve the efficacy of the runahead episode.

FIG. 1 schematically depicts m simplified form a micro-processing system 100 which provides a suitable operating environment for the system and methods examples described herein. Micro-processing system 100 includes a processor core 102 having a processing pipeline 104 and other components which may interact and communicate with a memory/storage subsystem 106 having various locations for holding instruction code, data, etc. Specifically, memory/storage subsystem 106 may include L1-L3 processor caches (114, 116 and 118), main memory 120 (e.g., one or more DRAM chips), secondary storage 122 (e.g., magnetic and/or optical storage units) and/or tertiary storage 124 (e.g., a tape farm). Core 102 also includes a number of processor registers 112, which may include both general and special purpose registers. Registers 112 are configured to hold instructions and data, and it will therefore be appropriate at times to consider them as part of memory/storage subsystem 106.

A memory controller 126 may be used to handle the protocol and provide the signal interface required of main memory 120, and, typically, to schedule memory accesses. The memory controller can be implemented on the processor die or on a separate die. It is to be understood that the locations set forth above are non-limiting and that other memory/storage locations may be used without departing from the scope of this disclosure.

Processing pipeline 104 in the present example includes fetch logic 128, hardware decoder 130, scheduling/dispatch logic 131, execution logic 132, mem logic 134, and writeback logic 136. Fetch logic 128 retrieves instructions from one or more of locations 110 (but typically from either unified or dedicated L1 caches backed by L2-L3 caches and main memory). As described in more detail below, a branch prediction unit 138 and runahead logic 140 may also be included on processor core 102.

Generally speaking, the memory/storage subsystem may include instruction code 150 and data 152. The instruction code may include target ISA code 154 configured to achieve functionality intended by the architectural designer (e.g. to implement an operating system, execute a driver or application, etc.). In the case of target ISA code, the typical operation is that fetch logic 128 retrieves the code from memory and hardware decoder (HWD) 130 decodes the instructions, for example, by parsing opcodes, operands, and addressing modes. The outputs of the HWD are native instructions which are provided to execution logic 132 by scheduling/dispatch logic 131. Execution logic 132 may include various execution mechanisms, including integer/arithmetic units, floating point units, load/store units, units for calculating addresses, etc.

In some implementations, code 150 may include native translations 156, each of which correspond to some portion of the target architectural code 154. The translations achieve the same functionality as the code that they correspond to but typically include various optimizations. The optimizations can provide faster and more efficient execution, reduced power consumption and other benefits. Specific optimizations may include consolidating instructions, reordering instructions, unrolling loops, and register renaming, to name but a few examples of types of optimizations. Translations may be generated based on a profiling of the architectural code, e.g., by profiler 158. In some examples profiler 158 operates dynamically and in real-time as the target ISA code is executed. A translator thread 160 may consume the profile data in order to form new translations. Typically, the translations are executed within processing pipeline 104 without significant use of HWD 130. Instead, the fetched translations bypass the hardware decoder and are provided directly to schedule/dispatch logic 131, which in turn dispatches them as appropriate to the various execution mechanisms.

Micro-processing system 100 may include a runahead mode of operation, various aspects of which may be controlled and managed by runahead logic 140. During execution, the system may encounter a latency condition causing it to stall—i.e., a, event that prevents the processor from doing meaningful work for a period of time. As indicated above, a variety of conditions may cause such a stall. A very common runahead trigger is a load miss in which an instruction undergoing execution requests data which is unavailable. In this example, the data may be unavailable because it does not reside in the location at which it was first requested (e.g., in L1 cache 114). The processor is prevented from furthering execution until the data is found by traversing the memory hierarchy (e.g., checking L2 cache etc.) and supplied to the load instruction which caused the stall. The runahead mode is configured to mitigate the performance loss and wasted time caused by this and other stalls. During the time that the processor would normally be stalled, execution continues speculatively and the pipeline "pre-processes" instructions that follow the runahead-triggering instruction. Such speculative execution is performed to detect further subsequent stall conditions (e.g., additional load misses) and to prefetch data for when the processor resumes normal operation.

Runahead can be triggered by and used to preempt/resolve other issues. For example, a stall can occur as a result of a store miss, in which an instruction requests to store data in a cacheline for which the instruction does not yet have permission (e.g., when the cacheline is in a non-permissive state and writes to it are blocked). Further, the processor may be stalled by a translation lookaside buffer (TLB) miss in which a virtual address requested of the TLB is not found and a physical address cannot be immediately returned to the requesting instruction. Stall conditions may further include mispredicted branches. This disclosure is applicable to all of these examples and any other stall conditions that might occur. Runahead logic 140 can play various roles in connection with runahead, including identifying triggering conditions, replaying instructions, checkpointing machine state, determining when to exit runahead, recovering state upon exit, etc.

Instruction code 150 may include runahead correlate code 162 which is configured to improve the efficacy of the runahead mode of operation, and/or to terminate runahead when it is unlikely to provide a benefit. In typical examples, a given portion of code (e.g., a portion of target ISA code 154 or a portion of a translation 156) has an associated runahead correlate stored in memory/storage subsystem 106. When the portion of code is encountered by the micro-processing system (e.g., when it is fetched, decoded, dispatched, etc.), the system branches to the runahead correlate instead of executing the original code if the system is operating in the runahead mode.

The runahead correlate code is configured specifically to more efficiently identify and resolve latency events likely to occur when the original code is eventually run outside of runahead. In certain settings, the runahead correlate code identifies more latency events, and identifies them more rapidly, relative to what would occur by simply executing the original code in runahead.

In some examples, the runahead correlate code is an alternate version of its associated portion of code but that deactivates, skips or otherwise omits certain instructions that do not further the purpose of runahead. One general category of instructions that may be omitted is instructions that would depend upon data that is missing due to the condition that caused the system to enter the runahead mode (e.g., data that was sought but that missed in the L1 cache). Such instructions cannot lead to latency events that are likely to occur when the code is executed outside of runahead. For example, if an address calculation or other control flow instruction depends upon the memory access that triggered runahead, executing that instruction can take that the machine down a path that was never intended and that will not occur when non-runahead execution resumes. In addition, instructions may be omitted based on those instructions being time-consuming; computationally intensive; consuming a lot of power; focusing on computations unrelated to address calculation or other memory operations; etc.

In another example of omitting instructions, one can envision an instruction loop that has thousands of instructions and only a handful of memory operations (e.g., a small number of loads and/or stores). In this case, an appropriate runahead correlate could prioritize the memory operations by omitting unrelated instructions. This strategy is premised on the assumption that executing the other instructions does not further the runahead objective, namely, identifying and beginning to resolve other independent latency events while the initial event is being serviced. Still further, executing those instructions would be time-consuming, therefore reducing the likelihood of encountering and beginning work on additional latency events. In addition to such a prioritizing of memory operations (and conversely, deprioritizing computations that are unlikely to uncover subsequent stalls), the correlate code may be adapted to more efficiently uncover TLB misses or branch mispredicts in the associated code. This increases the ability of the system to preempt and avoid these issues from occurring when the runahead episode terminates and the associated code is called upon to execute normally.

An alternate conception of some of the examples herein is that the runahead correlate code can be configured to emphasize/prioritize memory operations relative to non-memory operations (e.g., computations unrelated to memory access). In other words, address calculations, load operations, store operations, and the like can be accelerated, retained while other instructions are omitted, or otherwise emphasized in the runahead correlate code. This can include omitting unrelated operations in the original code, modifying the original code so that the memory operations are encountered sooner, changing control flow in the original code, etc. In addition to improving the ability to uncover subsequent stall conditions, the elimination or modification of instructions from the original code can reduce power consumption.

The runahead correlate code need not be a wholly distinct portion of code. In some cases, the runahead correlate may simply be instructions that affect how the original code will be executed. One example is to have the runahead correlate effect control flow over execution of instructions in the original portion of code, for example to skip instructions, jump to the next iteration of a loop, etc.

In still another example, the runahead correlate may simply be a command that causes the runahead episode to terminate. Some types of code may never or be highly unlikely to yield a subsequent stall condition, or only at great computational expense or power consumption, or only after a length of time that will far exceed the likely duration of runahead. When such a portion of code is encountered in runahead, the branching described herein avoids the unnecessary expense that would occur by allowing the runahead episode to continue.

A special purpose instruction may be used as the mechanism to achieve branching based on runahead. In the example of FIG. 1, instruction code 150 includes a condition-testing instruction 164 for determining whether the system is in runahead mode. As will be described in detail below, the condition-testing instruction may also be implemented to test for whether a register is poisoned, though the runahead check will be discussed first. The condition-testing instruction 164 typically is positioned within the primary code (e.g., target ISA code 154 or a native translation 156) so that it executes relatively infrequently, but at opportune times. In particular, there will be portions of the primary code for which it is very beneficial to have a runahead correlate (e.g., a computationally intensive loop with relatively few memory operations). The condition-testing instruction provides a mechanism for redirecting execution to the runahead correlate if the machine is in runahead, and the instruction is positioned at the logical exit point from the original code. In other words, when the pipeline encounters a portion of code for which a runahead correlate has been provided, the condition-testing instruction executes in order to determine if the machine is in runahead. If so, the machine redirects to the runahead correlate in order to enhance the ability to uncover and service additional stall conditions while the machine services the initial stall that triggered runahead.

In one implementation, runahead is checked for at the time of dispatch, such as when instructions are passed from schedule/dispatch logic 131 to one or more execution mechanisms of execution logic 132. In some cases, instructions may be tagged or associated with a bit or other indicator that the instruction is being processed in the runahead mode of speculative execution. Such a bit/indicator can be checked as the instruction is passed from the schedule/dispatch logic.

The runahead correlate code may be generated in various ways. In some cases, the software designer will provide runahead correlates at design time. For example, the designer may recognize at the outset that a particular portion of code is likely to frequently stall. In addition to coding to reduce the likelihood of having to enter runahead, the designer may elect to code an appropriate runahead correlate to improve runahead when it does occur. Part of the design process could also include embedding a condition-testing instruction at an appropriate place in the code which will be branched from during the runahead episode.

Runahead correlate code instead can be generated dynamically at runtime. In this implementation, code may be dynamically profiled as it executes, for example using profiler 158. Profiling can reveal that a particular portion of code is very likely to produce runahead events, which in turn can be used to prioritize the generation of a runahead correlate for that piece of code. For example, it would likely be beneficial to generate a runahead correlate for a section of code that generates frequent L2 cache misses. A further possibility for generating the correlate code is to have it inserted automatically (but statically) by the compiler.

Beyond rating the desirability of providing a runahead correlate for a piece of code, the characteristics of that code can be profiled in order to control the specifics of how the runahead correlate operates. Referring to the above example of a lengthy and computationally dense loop with very few memory operations, the profiler can identify these characteristics in its profile of the code. This information can then be provided to software/hardware that does the actual work of generating the runahead correlate code. In the example of FIG. 1, a correlate generator 166 consumes the profile data generated by profiler 158 in order to generate runahead correlates.

The present discussion also contemplates branching based on whether a register is poisoned (e.g., marked INV—invalid). This is applicable to poison existing both outside of runahead (e.g., architectural poison bits) and inside of runahead (e.g., marking a register as invalid if it contains missing data, such as due to a cache miss). When poison is detected while executing a portion of code, control flow branches out of the original code to other code based on the presence of the poison.

Poison testing and runahead testing may be combined in a single condition-testing instruction, such as instruction 164. The instruction may be executed in different modes to perform the desired test(s): (1) test for runahead only without regard for poison; (2) test for poison only without regard for runahead; (3) generate an affirmative output only when both the tested register is poisoned and the machine is in runahead. Alternatively, separate instructions may be employed, and/or the runahead and poison testing may occur through a wholly different mechanism than the example instruction shown in FIG. 1.

An example involving both a runahead and poison test is as follows: Assume a loop with N loads, each of which uses the value from the previous load as an address component for the next. Assuming a load-to-use latency of 3 cycles, each loop iteration can at best be done (naively) in 3N cycles. If the first load misses, each iteration will still take 3N cycles even though the other loads in the loop will do nothing, since the value from the first load will be a poisoned value (due to the miss) and therefore all subsequent loads will just deliver poison since their actual load addresses cannot be known. The testing herein could then be employed to test for run-ahead and whether the first load produced a poison result, and if both are true, skipping to the next iteration of the loop. This would allow for more "pre-processing" rather than wasting resources chasing a poisoned chain of values. Alternately, skipping the iteration would not be desired if the system is not in runahead, or if the load didn't miss during runahead (in which case it would be desirable to pre-fetch the next element of the chain).

Figure 2:
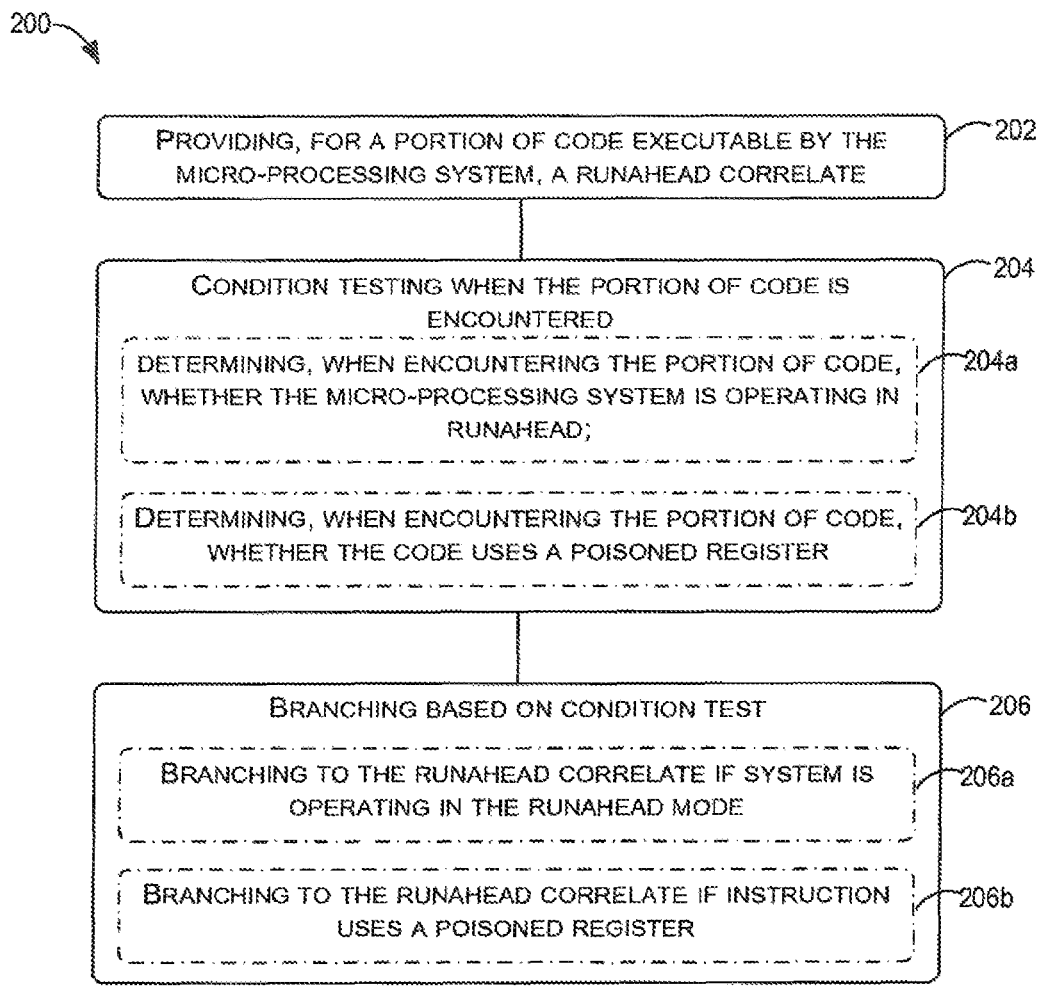
FIG. 2 depicts an example method implementation for operating a micro-processing system, including the capability of branching to alternate code based on one or both of a runahead determination and a poison determination.

Turning now to FIG. 2, the figure depicts a method 200 for operating a micro-processing system in which branching is performed based on whether the machine is operating in runahead and/or whether a register is poisoned. In this and in other figure descriptions, various references will be made to FIG. 1 and its accompanying description. In general, this should not be understood as requiring that the example methods be performed using the components of FIG. 1. Rather, one skilled in the art will appreciate that the described methods can be implemented with a widely varying range of hardware and software configurations.

At 202, method 200 includes providing a runahead correlate portion of code. As described above, the runahead correlate is associated with a first "normal" portion of code and may be executed in lieu of that code when it is determined that the machine is operating in runahead. The runahead correlate is as described above, i.e., it is specifically configured to execute in runahead and uncover and resolve latency events likely to occur when the normal code is executed outside of runahead, or to terminate/avoid runahead when it is unlikely to provide a benefit. The runahead correlate may be generated at design time, dynamically formed during runtime (e.g., based on a dynamic profiling of code) or otherwise created.

When the normal code is encountered, condition testing is performed, as shown at 204. The runahead testing is shown at 204a. Specifically, when the normal code is encountered in the pipeline (e.g., upon fetch, decode, etc.), the method determines whether the system is operating in runahead. As described above, this testing may be performed using a condition-testing instruction such as instruction 164 (FIG. 1). Condition testing may include, instead of or in addition to the runahead test, testing to determine whether a register is poisoned, such as the source register for an address calculation (204b). In some cases, it will be desirable to test both for runahead and for poison, as in the previously discussed example of pointer chasing. In other situations, only one of the tests may be performed. Condition-based branching is shown at 206, for example branching based on the output of condition-testing instruction 164. Specifically, branching may be based on an affirmative determination of runahead (206a), poison (206b), or that both conditions are true.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method of operating a microprocessor having a runahead mode, comprising:
    storing a runahead code portion that correlates to a portion of code that is executable by the microprocessor;
    responsive to encountering the portion of code at runtime, determining if the microprocessor is operating in a runahead mode; and
    responsive to the determining, branching to the runahead code portion if the microprocessor is operating in the runahead mode.

2. The method of claim 1, wherein the branching comprises:
    determining whether a register is poisoned; and
    branching to the runahead code portion if the microprocessor is operating in the runahead mode and the register is poisoned.

3. The method of claim 1, wherein the runahead code portion is configured to identify and resolve any latency events which occur when the portion of code is executed outside of the runahead mode.

4. The method of claim 3, wherein the latency events are selected from a group consisting of: a load miss, a store miss, a branch mispredict and a TLB miss.

5. The method of claim 1, wherein the runahead code portion is generated based on a dynamic profiling of the portion of code at runtime.

6. The method of claim 1, wherein the runahead code portion is an alternate version of the portion of code which omits one or more instructions in the portion of code.

7. The method of claim 1, wherein the runahead code portion is an alternate version of the portion of code that prioritizes memory operations in the portion of code.

8. The method of claim 1, wherein the runahead code portion comprises an instruction to terminate operation in runahead mode, and wherein the branching to the runahead code portion causes the microprocessor to exit runahead.

9. A method of operating a microprocessor having a runahead mode comprising:
    encountering an instruction within a processing pipeline of the microprocessor;
    executing and generating output of a condition-testing instruction operable to test whether the microprocessor is operating in the runahead mode when the instruction is encountered and whether the instruction uses a poisoned register; and
    branching out of a portion of code containing the instruction based on an output of the condition-testing instruction.

10. The method of claim 9, where the condition-testing instruction is selectively operable to disable the poison test wherein the branching out of the portion of code containing the instruction occurs if the runahead test is affirmative without regard for the poison test.

11. The method of claim 9, where the condition-testing instruction is selectively operable to disable the runahead test wherein the branching out of the portion of code containing the instruction occurs if the poison test is affirmative without regard for the runahead test.

12. The method of claim 9, where the condition-testing instruction is selectively operable to enable both the runahead test and the poison test, such that the branching out of the portion of code containing the instruction occurs if both the runahead test and the poison test are affirmative.

13. The method of claim 9, further comprising providing a runahead code portion that correlates to the portion of code that is executable by the microprocessor and branching to the runahead code portion when the runahead test is affirmative.

14. The method of claim 13, wherein the runahead code portion is an alternate version that omits instructions of the portion of code and that is configured to identify and resolve latency events which may occur when the portion of code is executed outside of runahead.

15. The method of claim 13, wherein the runahead code portion is generated based on a dynamic profiling of the portion of code.

16. The method of claim 13, wherein the runahead code portion comprises an instruction to terminate operation in runahead mode, such that the branching to the runahead code portion causes the microprocessor to exit runahead.

17. A microprocessor having a runahead mode, comprising:
a memory;
a processing pipeline configured to retrieve instructions and data from the memory;
runahead logic operatively coupled with the processing pipeline and operable to cause the microprocessor to enter the runahead mode upon occurrence of a stall condition in the processing pipeline; and
a portion of code contained in the memory and executable by the processing pipeline, wherein the processing pipeline is configured, in response to encountering the portion of code, to determine whether the microprocessor is in the runahead mode and, responsive to an affirmative determination, to branch to and execute a runahead code portion that correlates to the portion of code in lieu of executing the portion of code, the runahead code portion being configured to identify and resolve latency events which may occur when the portion of code is executed outside of runahead.

18. The microprocessor of claim 17, wherein the runahead code portion is an alternate version of the portion of code which omits one or more instructions in the portion of code.

19. The microprocessor of claim 17, wherein the runahead code portion is an alternate version of the portion of code that prioritizes memory operations in the portion of code.

20. The microprocessor of claim 17, wherein the runahead code portion comprises an instruction to terminate operation in runahead mode, and wherein the branching to the runahead code portion causes the micro-processing system to exit runahead.

* * * * *